United States Patent Office 3,577,392
Patented May 4, 1971

3,577,392
WORKABLE POLYAMIDES BY BLENDING WITH INORGANIC THIOCYANATES
Rajindar K. Kochhar and Bert H. Clampitt, Overland Park, and Ronald E. Gilbert, Shawnee Mission, Kans., assignors to Gulf Research & Development Company, Pittsburgh, Pa.
No Drawing. Filed Oct. 31, 1968, Ser. No. 772,396
Int. Cl. C08g 20/38
U.S. Cl. 260—78                                        3 Claims

ABSTRACT OF THE DISCLOSURE

Polyamides can be tailored to have more workable properties by blending with a minor portion of an inorganic thiocyanate such as sodium or potassium thiocyanate. With the exception of ammonium thiocyanate, which has the opposite effect on melt viscosity, the blends raise melt viscosity, and lower the normal freezing point. Individual physical properties of the extruded or molded polyamide blend remain the same or are improved, except with ammonium thiocyanate which reduces tensile strength and elongation.

BACKGROUND OF INVENTION

This invention relates to a composition and method of improving processability and melt characteristics of polyamides by blending a major portion of the polyamide with a minor portion of an inorganic thiocyanate in conventional blending apparatus.

Many attempts have been made to improve melt viscosity of polyamides without sacrificing other properties, such as processability. Melt viscosity can be improved by post polymerization to increase molecular weight, but such treatment has always resulted in a product which is melt-unstable on usual plastic forming equipment such as extruders with the result that formed products show a wide variation in physical properties. Nucleating agents like talc or calcium carbonate do not materially affect the workability of polyamides.

SUMMARY

Blending a major portion of a polyamide with a minor portion of an inorganic thiocyanate allows a blended composition which can be tailored to have properties which make it more workable than the unblended polyamide. The blend can be made in conventional plastic material forming apparatus. Blends prepared by using alkali metal thiocyanates raise melt viscosities, lower freezing points, and improve overall physical properties. Ammonium thiocyanate lowers melt viscosities without changing freezing points. Thus the processing properties of any given polyamide can be altered by making the appropriate polyamide-thiocyanate blend.

PREFERRED EMBODIMENTS

The blends of this invention can contain from about 99.99 to 80% by weight, based on the weight of the entire blend, of polyamide and, correspondingly, about 0.01 to 20% by weight of inorganic thiocyanate. A more preferred blend would be about 0.5 to 10% by weight of thiocyanate, and the preferred blend contains about 1 to 5% by weight of inorganic thiocyanate. Any of the inorganic thiocyanates, such as the alkali metal thiocyanates and ammonium thiocyanate can be used. Preferred alkali metal thiocyanates are sodium and potassium thiocyanate. Any polyamide can be used. Preferred polyamides are polycaprolactam, polyhexamethylene adipamide, poly(12-aminododecanoic acid), and polyhexamethylene sebacamide; most preferred is polycaprolactam.

The blends of this invention are prepared by simply blending polyamide with the inorganic thiocyanate. For example, dry inorganic thiocyanate can be added to molten polyamide and blended in conventional thermoplastic blending apparatus. The preferred method is to immerse the polyamide in a solution of the inorganic thiocyanate so that the solution impregnates the polyamide. Then the impregnated polyamide is blended in the molten state in conventional thermoplastic material blending apparatus whereby the inorganic thiocyanate becomes uniformly distributed throughout the polyamide. The polyamide can be vacuum dried before immersion in the thiocyanate solution, preferably at a temperature between about 50 to 100° C. The impregnated polyamide is generally dried in a vacuum oven and blended at a temperature above the melting point but below the decomposition temperature of the polyamide for about 1 minute to about 1 hour, preferably it is dried at a temperature between about 50 to 100° C. and blended at a temperature of between about 180° C. and 350° C. for about 2 minutes to ½ hour.

The uses of these polyamide-thiocyanate blends are the same as for the uses known in the art for the polyamides. Since these blends are more workable, they are more easily extruded, and can be also molded. Examples of possible uses are in extruded tubes, sheets, films, fibers and as molded parts. Oriented film could be broken down into fibers by processes known in the art.

The term polyamide, for purposes of this application, includes copolymers containing predominately amide comonomers and mixtures of polyamides or polyamide copolymers.

Preferred embodiments are illustrated by the following examples.

The following tables present data on polyamide-thiocyanate blends prepared by vacuum drying polyamide chips at 55° C.; then immersing the polyamide chips in an aqueous solution of the thiocyanate so that the chips are impregnated with the given parts by weight of thiocyanate, determined by the difference in weight before and after immersion; then drying the impregnated chips in a vacuum oven at 55° C. for 24 hours; then blending the impregnated chips in a Brabender Plasticorder for 10 minutes under a current of dry nitrogen at a temperature of 235 to 240° C. for polycaprolactam, polyhexamethylene sebacamide, and poly(12-aminododecanoic acid), and at a temperature of 275° C. for polyhexamethylene adipamide. Finally the blends are tested for the properties shown in Tables I, IA, II, and III.

TABLE I.—PHYSICAL PROPERTIES OF NYLON THIOCYANATE BLENDS

| Nylon | | Thiocyanate | | Melt flow index [1] | Tensile strength, p.s.i. | | Flexural stiffness | Shore "D" hardness | Solution [2] viscosity | I.T.[3] at 235° C., g. | Melt stability [4] | | | |
|---|---|---|---|---|---|---|---|---|---|---|---|---|---|---|
| Type | Parts by weight | Type | Parts by weight | | Yield | Break | | | | | 6 min. | 9 min. | 12 min. | 15 min. |
| Nylon 6 (NX-3013, Gulf Oil Corp.) | 100 | | | 14.82 | 5,465 | 6,413 | 226,274 | 76 | 2.76 | 0.4 | | | | |
| Do | 99 | NaCNS | 1 | 8.07 | 8,570 | 12,517 | 170,890 | 78 | 2.33 | 1.9 | | | | |
| Do | 97 | NaCNS | 3 | 5.13 | 7,520 | 12,484 | 141,705 | 81 | 2.43 | 1.8 | 5.62 | 5.50 | 5.71 | 5.54 |
| Do | 95 | NaCNS | 5 | 3.89 | 6,411 | 11,580 | 132,764 | 79 | 2.48 | 2.4 | | | | |
| Do | 99 | KCNS | 1 | 9.35 | 9,318 | 10,321 | 204,198 | 82 | 2.53 | 1.3 | | | | |
| Do | 97 | KCNS | 3 | 8.76 | 9,081 | 10,450 | 176,294 | 79 | 2.58 | 1.5 | 8.76 | 8.53 | 8.61 | 8.79 |
| Do | 95 | KCNS | 5 | 6.60 | 8,320 | 10,630 | 145,850 | 81 | 2.58 | 2.0 | | | | |
| Do | 99 | NH₄CNS | 1 | 79.7 | 5,368 | 7,955 | 95,497 | 76 | | | | | | |
| Nylon 6 (Ultramid B4, BASF) | 100 | | | 9.52 | 8,073 | 12,109 | 172,511 | 78 | 3.83 | 2.1 | | | | |
| Do | 99 | NACNS | 1 | 3.52 | 8,353 | 14,631 | 166,350 | 81 | 2.98 | 3.0 | 3.91 | 4.14 | 4.32 | 4.66 |
| Do | 97 | NACNS | 3 | 1.65 | 6,713 | 12,670 | 141,276 | 81 | 3.14 | 1.8 | 1.66 | 1.77 | 1.76 | 1.82 |
| Do | 95 | NACNS | 5 | 0.68 | | | | 80 | 3.09 | 3.0 | | | | |
| Do | 99 | KCNS | 1 | 3.51 | 8,897 | 12,289 | 184,293 | 80 | 3.09 | 3.0 | 3.42 | 3.48 | 3.70 | 3.81 |
| Do | 97 | KCNS | 3 | 2.93 | 8,175 | 13,745 | 144,855 | 80 | 3.12 | 4.0 | 2.45 | 2.61 | 2.88 | 2.79 |
| Do | 95 | KCNS | 5 | 0.78 | | | | | | | | | | |
| Do | 99 | NH₄CNS | 1 | 123 | | 6,588 | 108,063 | 77 | | | | | | |
| Do | 97 | NH₄CNS | 3 | HIGH | | 6,130 | 101,541 | 77 | | | | | | |

[1] Decigrams per minute at 235° C./2,160 g.; 3 min. temperature equalization time.
[2] 1% solution in 90% formic acid.
[3] Initial tension (gms.), a measure of the melt strength.
[4] M.F.I. after heating the given number of minutes at 235° C.

TABLE IA.—PHYSICAL PROPERTIES OF NYLON THIOCYANATE BLENDS

| Nylon | | Thiocyanate | | Melt flow index [1] | Tensile strength, p.s.i. | | Flexural stiffness | Tensile impact | I.T.[2] (gms.) | Shore "D" Hardness |
|---|---|---|---|---|---|---|---|---|---|---|
| Type | Parts by weight | Type | Parts by weight | | Yield | Break | | | | |
| Nylon 66 (Du Pont Zytel-42) | 100 | CONTROL | | 52.20 | 8,762 | 10,304 | 232,920 | 112.6 | 1.3 | 82 |
| Nylon 66 | 99 | NH₄CNS | 1 | 83.84 | | 10,364 | 236,524 | 81.4 | 2.6 | 82 |
| Do | 97 | NH₄CNS | 3 | HIGH | | | 209,628 | | Fast | 82 |
| Do | 99 | KCNS | 1 | 38.16 | | 8,453 | 196,697 | 92.3 | 2.0 | 81 |
| Do | 97 | KCNS | 3 | 31.19 | | 7,853 | 207,571 | 78.6 | Fast | 81 |
| Nylon 610 (Du Pont Zytel-31) | 100 | CONTROL | | 91.51 | 5,912 | 6,024 | 152,071 | 62.7 | | 74 |
| Nylon 610 | 99 | NH₄CNS | 1 | 124.0 | 6,611 | 7,827 | 120,628 | 81.8 | 1.3 | 77 |
| Do | 97 | NH₄CNS | 3 | HIGH | | 5,642 | 91,767 | 65.6 | Fast | 77 |
| Do | 99 | KCNS | 1 | 27.55 | 7,063 | 11,219 | 135,388 | 108.2 | 0.9 | 78 |
| Do | 97 | KCNS | 3 | 18.23 | 7,467 | 7,773 | 127,001 | 116.6 | Fast | 78 |
| Nylon 12 (Olin 1203) | 100 | CONTROL | | 6.03 | 6,212 | 7,108 | 116,745 | 104.5 | | 73 |
| Nylon 12 | 99 | NH₄CNS | 1 | 14.0 | 7,182 | 7,111 | 126,303 | 73.3 | 3.1 | 72 |
| Do | 97 | NH₄CNS | 3 | 20.0 | | 5,396 | 92,916 | 55.9 | 0.4 | 71 |
| Do | 99 | KCNS | 1 | 3.63 | 6,762 | 10,866 | 127,330 | 173.0 | 2.8 | 75 |
| Do | 97 | KCNS | 3 | 2.35 | 7,093 | 10,046 | 71,623 | 94.4 | 1.2 | 64 |

[1] Decigrams per minute, nylon 66 at 275° C.; nylon 610 at 235° C. and nylon 12 at 190° C. A dead weight of 2160 g. was employed in each case.
[2] Initial tension draw at 25'/min.

TABLE II.—FLOW DATA FOR NYLON 6 BLEND WITH NaCNS AT 235° C.

| Composition, percent thiocyanate | Melt flow index, g./10 min. | Viscosity at (poises)— | | |
|---|---|---|---|---|
| | | $10^5$ dynes/cm. | 1,000 sec.⁻¹ | 13.89 sec.⁻¹ |
| 0 | 14.82 | 8,000 | 2,900 | 8,098 |
| 2.5 | 7.48 | 13,000 | 3,500 | 12,147 |
| 5 | 4.10 | 25,000 | 4,800 | 20,244 |

The effects of blends on physical properties can be seen in the tables. Note the melt flow index for nylon 6 dropped from about 14.8 with no thiocyanate to about 3.9 with 5 percent NaCNS. Both tensile strength and elongation increased with the addition of alkali metal thiocyanate. The break tensile rose from about 6,400 to about 11,500 with the addition of 5 percent NaCNS. Elongation (not shown in the tables) went from 55 percent with no thiocyanate to 120 percent with 2.5 percent sodium thiocyanate. Melt strength, as shown by initial tension, also increases and so does the melt stability.

Ammonium thiocyanate, as can be seen in the table, can be used to lower melt viscosity, tensile strength, elongation and stiffness. Thus, the thiocyanates can be used to tailor the polyamide properties upward or downward.

The following is a list of test methods for the various properties.

Melt flow index _____ASTM D1238–65T FR–R.
Stiffness _____ASTM D747–63.
Tensile _____ASTM D638–64T.

DIFFERENTIAL THERMAL ANALYSIS (DTA) OF THIOCYANATE CONTAINING POLYAMIDES

One method of evaluating the effect of additives on crystal and other properties of the resins is through the use of differential scanning calorimeter. Any changes in the physical properties are likely to show up in their crystallization behavior and hence the melting and freezing curves of the polymers. Melting and freezing characteristics of these blends are given in Table III.

An interesting feature of DTA curves is that with increasing concentration of thiocyanates in the blend there is a continued suppression of the freezing point. In the thiocyanate blends a differentiation can be made between those prepared with alkali metal compounds on the one hand and ammonium salts on the other. Alkali metal thiocyanate-nylon compositions show a deep depression in the melting temperatures and those containing small amounts of ammonium thiocyanate with nylon are not much different from the base resin in this respect.

3. The article of manufacture of claim 1 wherein the polyamide is polycaprolactam.

TABLE III.—THERMAL ANALYSIS OF NYLON 6 BLENDS

| Sample | | Sample wgt., mg. | Scan rate, °/min. | Melting temperature, ° C. | | | Cooling rate | Freezing range, ° C. |
|---|---|---|---|---|---|---|---|---|
| | | | | Minor | Shoulder | Major | | |
| 100% nylon 6 | Spl. 1 | 10.10 | 20 | | | 219, 221½ | 80 | 167–146 |
| | | | 20 | | 210 to 213 | 220 | 40 | 175 |
| | Spl. 2 | 10.05 | 20 | | 212 to 214 | 221 | 20 | 181½ |
| | | | 20 | | | 115, 220 | 80 | 166–147 |
| 99% nylon 6; 1% NaCNS | Spl. 1 | 10.00 | 20 | | | 215 | 80 | 152 |
| | | | 20 | 195 | | 207, 216 | 40 | 165.5 |
| | Spl. 2 | 10.10 | 20 | | | 214 | 20 | 174 |
| | | | 20 | | | 209, 215 | 80 | 154–147 |
| 97% nylon 6; 3% KCNS | Spl. 1 | 10.00 | 20 | | | 211 | 80 | 146 |
| | | | 20 | | 198 to 201 | 212 | 40 | 160 |
| | Spl. 2 | 10.00 | 20 | | | 212 | 20 | 169 |
| | | | 20 | | 205 to peak at— | 212 | 80 | 147 |
| 97% nylon 6; 3% NaCNS | Spl. 1 | 10.00 | 20 | | | 205 to 209 | 80 | 139.5 |
| | | | 20 | | | 208 | 40 | 154 |
| | Spl. 2 | 10.06 | 20 | | | 208 | 20 | 164.5 |
| | | | 20 | | 201 to 205 | 208 | 80 | 141 |
| 95% nylon 6; 5% KCNS | Spl. 1 | 10.04 | 20 | | | 205.5 | 80 | 132 |
| | | | 20 | | 197, 206 | | 40 | 146 |
| | Spl. 2 | 10.06 | 20 | | | 206 | 20 | 157 |
| | | | 20 | 185 | 197 to 201 | 206 | 80 | 132 |
| 95% nylon 6; 5% NaCNS | Spl. 1 | 10.04 | 20 | | | 204 | 80 | 129 |
| | | | 20 | | | 201, 204 | 40 | 144 |
| | Spl. 2 | 10.04 | 20 | | | 205 | 20 | 155 |
| | | | 20 | | 192 to 201 | 204 | 80 | 129 |
| 99% nylon 6; 1% NH₄CNS | Spl. 1 | 9.98 | 20 | | | 219 | 80 | 162.5–153 |
| | | | 20 | | 207 to 211 | 219 | 40 | 172.5 |
| | Spl. 2 | 10.00 | 20 | | | 218 | 20 | 182 |
| | | | 20 | | | 213, 219 | 80 | 164–155 |

What is claimed is:

1. An article of manufacture consisting essentially of from about 99 to about 95 weight percent of a polycarbonamide having uniformly distributed throughout from about 1 to about 5 weight percent of an inorganic thiocyanate selected from the group consisting of sodium thiocyanate and potassium thiocyanate, said polycarbonamide having improved processability.

2. The article of manufacture of claim 1 wherein the polycarbonamide is selected from the group consisting of polycaprolactam, polyhexamethylene adipamide, polyhexamethylene sebacamide and poly(12-aminododecanoic acid).

References Cited

UNITED STATES PATENTS

| | | | |
|---|---|---|---|
| 2,340,652 | 2/1944 | Dwyer | 260—78 |
| 2,381,063 | 8/1945 | Küng | 260—78 |
| 2,557,808 | 6/1951 | Walker | 260—78 |
| 2,823,093 | 2/1958 | Steiger | 260—78 |
| 2,869,973 | 1/1959 | Hubbard et al. | 260—78 |

HAROLD D. ANDERSON, Primary Examiner

U.S. Cl. X.R.

260—45.9R, 78A, 78L, 78S, 78SC